(12) United States Patent
Gauthier-Manuel

(10) Patent No.: US 12,051,837 B2
(45) Date of Patent: Jul. 30, 2024

(54) ANIONIC POLYELECTROLYTE

(71) Applicants: CENTRE NATIONAL DE LA RECHERCHE SCIENTIFIQUE, Paris (FR); UNIVERSITE DE FRANCHE-COMTE, Besancon (FR)

(72) Inventor: Bernard Gauthier-Manuel, Besancon (FR)

(73) Assignees: CENTRE NATIONAL DE LA RECHERCHE SCIENTIFIQUE, Paris (FR); UNIVERSITE DE FRANCHE-COMTE, Besancon (FR)

( * ) Notice: Subject to any disclaimer, the term of this patent is extended or adjusted under 35 U.S.C. 154(b) by 0 days.

(21) Appl. No.: 17/771,914

(22) PCT Filed: Oct. 28, 2020

(86) PCT No.: PCT/EP2020/080219
§ 371 (c)(1),
(2) Date: Apr. 26, 2022

(87) PCT Pub. No.: WO2021/083922
PCT Pub. Date: May 6, 2021

(65) Prior Publication Data
US 2022/0376285 A1  Nov. 24, 2022

(30) Foreign Application Priority Data

Oct. 28, 2019  (EP) .................................... 19306399

(51) Int. Cl.
*H01M 8/1088*   (2016.01)
*H01M 8/10*     (2016.01)
(Continued)

(52) U.S. Cl.
CPC ....... *H01M 8/1088* (2013.01); *H01M 8/1023* (2013.01); *H01M 8/1039* (2013.01);
(Continued)

(58) Field of Classification Search
CPC ............. H01M 8/1023; H01M 8/1039; H01M 8/1088; H01M 4/8868; H01M 2008/1095;
(Continued)

(56) References Cited

U.S. PATENT DOCUMENTS

2008/0233451 A1* 9/2008 Hong .................. H01M 8/1039
429/492
2012/0045650 A1* 2/2012 Iwazumi ................. C08J 7/056
427/386

FOREIGN PATENT DOCUMENTS

JP          4662626 B2 *  3/2011   ........... B01D 53/228

OTHER PUBLICATIONS

JP 4662626 B2—English Translation—Accessed Sep. 12, 2023 (Year: 2011).*

(Continued)

*Primary Examiner* — Allison Bourke
*Assistant Examiner* — Bethany C Garcia
(74) *Attorney, Agent, or Firm* — WC&F IP

(57) ABSTRACT

The present invention relates to a composite material comprising a porous solid matrix having interconnected channels, said matrix comprising sulfonate groups on at least a part of the surface of said channels, wherein a sulfonate group is in ionic interaction with a quaternary ammonium of a polymerizable molecule. The present invention also relates to a method for preparing such a composite material and applications thereof.

14 Claims, 5 Drawing Sheets

(51) Int. Cl.
*H01M 8/1023* (2016.01)
*H01M 8/1039* (2016.01)

(52) U.S. Cl.
CPC ............. *H01M 2008/1095* (2013.01); *H01M 2300/0082* (2013.01)

(58) Field of Classification Search
CPC ............ H01M 2300/0082; H01M 2300/0088; H01M 8/10; H01M 8/1044; H01M 8/1037; H01M 8/1025; H01M 8/1018; H01M 8/1074; B01D 2323/00–21828; B01D 2323/30; C25B 9/73; C25B 13/08; Y02P 70/50; Y02E 60/36; Y02E 60/50; Y02E 60/10; C23F 11/141; C08K 5/17; C08F 214/262; C08F 14/26
See application file for complete search history.

(56) References Cited

OTHER PUBLICATIONS

Ogumi et al: "Modification of ion-exchange membrane surface by plasma process. Part 2. Monovalent cation permselective membrane from perfluorosulfonate cation exchange membrane", Journal of Membrane Science, vol. 54, No. 1, p. 163-174, Nov. 15, 1990.

Salerno et al: "Anion exchange membranes derived from nafion precursor fro the alkaline fuel cell", Journal of Polymer Science Part B: Polymer Physics, vol. 50, No. 8, p. 552-562, 2012.

Zeng et al: "Studies on polypyrrole modified nafion membrane for vanadium redox flow battery, Electrochemistry Communications", vol. 10, No. 3, p. 372-375, Dec. 28, 2007.

Zhang: "Ecperimental and characterisation", Electronic Supplementary Material (ESI) for Chemical Communications, Dec. 31, 2012.

* cited by examiner

ANIONIC POLYELECTROLYTE

The present invention relates to a composite material forming an anionic polyelectrolyte. More particularly, the present invention relates to an anionic membrane, typically for a fuel cell, notably of the PEM (Polymer Exchange Membrane) type.

TECHNOLOGICAL BACKGROUND

One of the essential components of good operation of a fuel cell of the PEM type is the membrane conducting the ions inside the cell. Traditionally these cells operate in a cationic mode and this function is ensured by an expensive ionomer proton conductor such as Nafion® (polytetrafluoroethylene with perfluorovinyl ether groups terminated with sulfonated groups incorporated into a backbone of the polytetrafluoroethylene). However, this poses the technical problem of imposing operation under cationic conditions. Moreover this also requires to operate with platinum as a catalyst. These technical problems are an obstacle to the development of these devices. Indeed, platinum is a rare and expensive metal which for example should be replaced with other metals less expensive such as nickel, etc. Such metals are presently used in great power stationary installations operating at a high temperature for working under anionic conditions and thereby replacing platinum. However, these methods impose working at a high temperature and therefore membranes should be available allowing operation at room temperature. This should open the door to miniature anionic fuel cells.

Modified Nafion® membrane is known by Salerno Holly L. S., et al. (Anion exchange membranes derived from nafion precursor for the alkaline fuel cell, Journal of Polymer Science Part B: Polymer Physics 2012, 50, pp 552-562). This article teaches that robust hydroxide conducting membranes are required for long-lasting, low-cost solid alkaline fuel cells (AFCs). Nafion-based anion exchange membranes (AEMs) was synthetized via amination of the Nafion precursor membrane with 1,4-dimethylpiperazine. This initial reaction produces an AEM with covalently attached dimethylpiperazinium cations neutralized with fluoride anions, while a subsequent ion exchange reaction produces a hydroxide ion conducting membrane. These AEMs possess high thermal stability and different thermal transition temperatures compared to Nafion.

Modified Nafion® membrane is also known by Min-suk J. Jung et al. (A Perfluorinated Anion Exchange Membrane with a 1,4 Dimethylpiperazinium Cation, J. Mater. Chem., 2011, 21, (17), pp 6158-6160) which describe a perfluorinated anion exchange membrane with a 1{,}4-dimethylpiperazinium cation demonstrated better hydroxide ion conductivity and three-fold reduction in water uptake compared to a hydrocarbon AEM with the same cation. The perfluorinated AEM was stable over 30 days in 2 M KOH at 60° C. and demonstrated good fuel cell performance.

Modified Nafion® membrane is also known by Schmidt, C. et al. (Modification of Nafion Membranes by Impregnation with Ionic Liquids, Chemical Engineering & Technology 2008, 31, No. 1, pp 13-22) which describe that Nafion 117 membranes were impregnated with various imidazolium (1-hexyl-3-methyl-imidazolium/HMI, 1-butyl-3-methyl-imidazolium/BMI) and pyrrolidinium (1-butyl-1-methyl-pyrrolidinium/BMPyr) based ionic liquids bearing hydrophobic (tris(pentafluoroethyl)trifluorophosphate/FAP, bis (trifluoromethylsulfonyl)imide/BTSI, hexafluorophosphate/PF 6) and more hydrophilic (tetrafluoro-borate/BF4) anions. Upon this treatment, the ionic liquids' cations partially replace the protons of the sulfonic acid groups in Nafion. According to this article, modification of Nafion by ionic liquids bearing the bulky hydrophobic FAP anion seems promising.

However, a good anionic Nafion® membrane is still to develop.

Aims of the Invention

The object of the present invention is to solve the technical problems mentioned above.

More particularly, the object of the present invention is to provide an anionic porous solid matrix which may operate in a fuel cell, preferably at room temperature.

An object of the present invention is also to provide an anionic porous solid matrix with which platinum may be replaced with other metals in particular less expensive, such as nickel in a fuel cell. The object of the present invention is also to provide an anionic porous solid matrix which is stable in an alkaline medium.

Thus, an object of the present invention is to provide a less expensive anionic porous solid matrix, stable and for which the conductometric performances are close to those of standard proton membranes used in fuel cells. More particularly, the object of the invention is to provide a membrane used in devices or methods for generating hydrogen and/or oxygen by electrolysis of water.

Thus, an object of the present invention is to provide a modification of commercial fuel cell electrodes to enable their use in anionic fuel cells.

The object of the present invention is further to provide an anionic porous solid matrix, which may be used in a biologically compatible device notably for being implanted in a human or animal body.

An object of the present invention is further to provide a selective membrane for extraction of ions from aqueous solutions.

An object of the present invention is further to provide a process for preparing such anionic porous solid matrix at acceptable costs to provide an industrial process.

DETAILED DESCRIPTION OF THE INVENTION

A currently available electrolyte membrane is a sulfonated tetrafluoroethylene membrane, i.e., Nafion electrolyte membrane, available from Dupont Co.

The present invention relates to a composite material comprising a porous solid matrix having interconnected channels, said matrix comprising sulfonate groups on at least a part of the surface of said channels, wherein a sulfonate group is in ionic interaction with a quaternary ammonium of a polymerizable molecule.

Inventors have surprisingly discovered that such a porous matrix having interconnected channels bearing sulfonated groups on at least a part of the surface thereof provide a very strong ionic interaction with quaternary ammonium present advantageously in a polymerizable molecule. Such strong ionic interaction in the interconnected channels of said porous matrix is used advantageously to prepare a composite material for ink or membrane application, such as typically for fuel cells.

In one embodiment, said porous solid matrix is a sulfonated tetrafluoroethylene membrane, for example a Nafion® membrane.

The present invention presents the technical advantage of providing an anionic ink for fuel cells.

Advantageously, the present invention provide a novel sulfonated tetrafluoroethylene membrane, for example a Nafion® membrane comprising oligomers of polymerisable molecule bearing quaternary ammonium in ionic interaction with sulfonated groups of interconnected channels of said membrane.

Advantageously, said porous matrix is solid.

The present invention to an anionic polyelectrolyte comprising or consisting of said composite material.

In one embodiment, said channels of said porous matrix have a diameter of 1 to 20 nanometers.

In one embodiment, said polymerizable molecule is polymerized thereby forming an oligomer.

Typically, said oligomer comprises 2, 3 or 4 repeating units of said polymerizable molecule.

Preferably, said polymerizable molecule is a silane or a mixture of silane comprising at least one quaternary ammonium group and at least one polymerizable group.

A silane may be illustrated according to the present invention by the general formula SimH2m+2, wherein at least one hydrogen atom is replaced with a polymerizable group and at least one other hydrogen atom is replaced with a substituent bearing at least one quaternary ammonium group, m represents the number of silicon atoms in the silane. According to a preferred alternative, m represents the FIG. 1.

Advantageously, the substituent comprises a spacer group between the silicon atom and the cationic group. According to an alternative, a spacer group is an alkyl group optionally comprising one or several heteroatoms, for example selected from O, N, and S, and/or optionally comprising one or several aromatic groups.

One or several of the hydrogen atoms present in the spacer group may for example be replaced with a halogen atom, and preferably with a fluorine atom. The spacer group may notably comprise a group —$CF_2$—.

In one embodiment, said polymerizable molecule comprises a Si—O bound or form siloxanes after polymerization (oligomerization).

In one embodiment, said polymerizable molecule is a polymerizable molecule of formula (I):

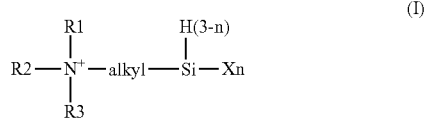

wherein n is 1 2 or 3, and preferably 3, "alkyl" is a linear or branched saturated alkyl group optionally substituted, R1, R2 and R3 are substituents of the nitrogen atom, either identical or different, Xn are substituents of the Silicon atom, either identical or different, and at least one Xn represents a polymerizable group.

In one embodiment, Xn, identical or different, are independently selected among alkoxy groups, optionally substituted, and typically are methoxy groups.

In one embodiment, R1, R2 and R3 are a linear saturated alkyl, typically a C1 to C4 alkyl, either identical or different.

In one embodiment, said polymerizable molecule is a N-dialkoxysilylalkyl-N,N,N-tri-alkylammonium or N-trialkoxysilylalkyl-N,N,N-tri-alkylammonium.

For example, X is a hydroxy or alkoxy group. From among alkoxy groups, mention may notably be made of $C_1$-$C_4$ alkoxy groups and more particularly methoxy, ethoxy, and propoxy groups. It is possible to contemplate the use of chlorosilanes (Cl group) but the conditions are more difficult to control notably as regards controlling hygrometry.

Advantageously, the silane bears two or three groups X. According to an alternative, at least one group X is a methoxy group.

Advantageously, the presence of at least one portion of the silane mixture includes 3 groups X so as to allow three-dimensional growth of the polymerizable molecule leading to a gel structure of silane into the pores.

In one embodiment, X represents methoxy groups and n is 3.

According to a particular embodiment, at least one of R1, R2, R3 is an alkyl group. In one embodiment, R1=R2=R3.

Preferably, in formula (I) the substituents R1, R2 and R3 are selected from among a $C_1$-$C_4$ alkyl or a chorine atom.

In one embodiment, R1, R2 and R3 represent a methyl group.

An "alkyl" group (or spacer group) covalently linking the Nitrogen and the Silicon atom is selected among a methyl, ethyl, propyl, and butyl group.

Preferably, n represents 2 or 3 (difunctional or trifunctional silane).

It is advantageously possible to use a polymerizable molecule selected from among: dimethyloctadecyl[3-(trimethoxysilyl)propyl]ammonium chloride (CAS 27668-52-6); N,N-didecyl-N-methyl-N-(3-trimethoxysilylpropyl) ammonium chloride (CAS 68959-20-6); 3-(N-Styrylmethyl-2-aminoethylamino)-propyltrimethoxysilane hydrochloride (CAS 34937-00-3); tetradecyldimethyl(3-trimethoxysilylpropyl)ammonium chloride (CAS 41591-87-1).

Preferably, N-trimethoxysilylpropyl-N,N,N-trimethylammonium chloride (CAS 35141-36-7) is used as polymerizable molecule.

In one embodiment, said polymerizable molecule is 3-(Trimethoxysilyl)propyl-N,N,N-trimethylammonium (TMSPA, CAS 35141-36-7), Advantageously, the polymerized molecule (oligomer) has at least two quaternary ammonium groups, one allowing the ionic interaction with sulfonate groups of the matrix and another providing the ionic conductivity.

By said ionic interaction (also called here ionic grafting), said matrix present a neutral ionic charges.

Accordingly, interaction of a sulfonated group of the matrix with a monomer with a single quaternary ammonium leads to non-ionic conducting membrane (all negatives ions are neutralized by positive ones). Interaction of a sulfonated group of matrix with a dimer having two quaternary ammonium groups and Cl$^-$ as counter-ions gives a conductivity lower than the conductivity with H$^+$ counter-ions. Advantageously, in one embodiment, Cl$^-$ counter-ions are replaced by OH$^-$ counter-ions to increases the ionic conductivity. Advantageously, interaction of a sulfonated group of matrix with a trimer or tetramers having more than 2 quaternary ammonium groups present a higher conductivity than with a dimer.

By polymerizing said polymerizable molecule, which comprises quaternary ammonium, the ionic charge of the porous matrix becomes positive, and even more with increasing the polymerization degree of said polymerizable molecule. Advantageously, the polymerization is an oligomerization in order not to block the ionic conduction of said channels in said porous matrix.

In one embodiment, said porous solid matrix is conducting ions, and preferably anions.

In one embodiment, the composite material is a sulfonated tetrafluoroethylene membrane, for example a Nafion® membrane having hydroxyl (OH⁻) conducting groups (called Nafion®-OH with comparison to Nafion®-H membrane).

In one embodiment, said porous solid matrix is Nafion® N115, N117, NRE 211 or NRE 212.

In one embodiment, the composite material comprises from 1M to 4 M quaternary ammonium. Such concentration may be measured for example by Infrared spectroscopy, in particular of the doublet at about 1480 $cm^{-1}$ (characterizing of the quaternary ammonium) and applying the Beer-Lamber Law. This concentration is for example measured specifically by transmission infrared spectroscopy by utilizing the optical transparency of the doped porous silicon in this range of frequencies. Typically, the disappearance of the large and intense band between 2000 $cm^{-1}$ and 3000 $cm^{-1}$ indicates that all the $H_3O^+$ ions have been expulsed and replaced with quaternary ammonium ions.

Specific quantification results from the prior calibration of the area of the frequency band associated with a covalent bond characteristic of the cationic group, for example that of the characteristic doublet of N—$CH_2$ bonds at 1,481 and N—$CH_3$ bond at 1,492 $cm^{-1}$ for the quaternary ammonium groups, by using the reagents in solution in a solvent, for example methanol, at a known concentration and placed in a liquid cell, the thickness of which is specifically measured simultaneously by interferometry. This concentration is added to the actual concentration of porous matrix by taking into account the volume of the porosity of the sample.

Preferably, the porous solid matrix has a significant specific surface area and a high surface roughness.

For producing an ionic membrane for a fuel cell, it is necessary that the porous solid matrix has a sufficient amount of pores crossing along the thickness of the matrix in order to allow a ionic conductivity. This result may be validated after preparation of the membrane by checking its ionic conductivity.

The presence of the pores (notably mesopores and/or micropores) gives the possibility inter alia, of increasing the specific surface area of the silicon substrate. The porosity of the silicon is comprised between about 10% and about 70% by volume. The specific surface area of the silicon is comprised between about 200 and about 900 $m^2 \cdot cm^{-3}$. This specific surface area may for example be determined by the BET method when the silicon is in a sufficient amount. The aforementioned BET method is the BRUNAUER-TELLER method notably described in The Journal of the American Chemical Society, Volume 60, page 309, February 1938 and corresponding to the international standard ISO 5794/1. The specific surface area of a silicon may for generally be determined by quantification of the mass of a self-assembled silane monolayer on the surface of the porous silicon to be characterized.

The diameters of the pores of the solid porous matrix are preferably comprised between 5 and 40 nm (this diameter is understood of the pores of the solid porous matrix before contacting with the polymerizable molecule). The diameter of the pores is measured by Scanning Electron Microscopy (SEM) on a section of the material obtained by cleaving. This is the diameter of the pores as observed in an SEM.

The present invention also relates to a method for preparing a composite material as defined in the present invention.

The present invention relates to a method converting a cationic polyelectrolyte having sulfonate groups into an anionic polyelectrolyte. Such method comprises a ionic interaction of said sulfonate groups with quaternary ammonium groups of polymerizable molecules.

More particularly, the present invention relates to a method for preparing a composite material as defined according to the present invention, wherein said method comprises:

a providing a porous solid matrix having interconnected channels, said matrix comprising sulfonate groups on at least a part of the surface of said channels;

contacting said porous solid matrix with a polymerizable molecule comprising a quaternary ammonium thereby forming ionic interactions between a sulfonate group and quaternary ammonium.

In one embodiment, said method comprises:
polymerizing, preferably oligomerizing, said polymerizable molecule after having contacting said porous solid matrix with said polymerizable molecule.

In one embodiment, said method comprises:
exchanging a counter-ion of said quaternary ammonium, preferably by providing OH⁻ ion to said quaternary ammonium, for example by ionic exchange membrane (Amberlyst® OH).

In one embodiment, said polymerizable molecule is deposited by chemical vapor deposition on at least a part of the surface of said channels of said porous solid matrix.

In one embodiment, said polymerizable molecule is deposited by dipping (dip coating) said porous solid matrix into a solution comprising said polymerizable molecule.

In one embodiment, said polymerizable molecule is deposited by chemical vapor deposition on at least a part of the surface of said channels of said porous solid matrix and then by dipping said porous solid matrix into a solution comprising said polymerizable molecule.

In one embodiment, the contact of said porous solid matrix with a polymerizable molecule comprising a quaternary ammonium is performed at a temperature of more than 30° C.

In one embodiment, the contact of said porous solid matrix with a polymerizable molecule comprising a quaternary ammonium is performed in two stages.

An example of a two stages process is as follows:
firstly, adsorbing said polymerizable molecule on at least a part of the surface of said channels of the porous solid matrix, preferably at low temperature (lower than 15° C., preferably 10° C.), preferably in sealed vial to prevent polymerization;

Secondly, heating the adsorbed polymerizable molecule in presence of water (typically a drop of water), for example at a temperature higher than 30° C., preferably of 40 to 60° C., typically a temperature of 50° C., to polymerize the polymerizable molecules.

Advantageously, when using a silane such as for example TMSPA, in solution in a solvent (typically methanol), the first stage (adsorption stage) can be preceded by an adsorption in vapor phase to prevent deformation of the porous solid matrix by said solvent.

Typically, the result of polymerization is easily characterized by transmission infrared spectroscopy. For example, with TMSPA, the characteristic band of methoxy group at 2840 $cm^{-1}$ has disappeared after polymerization.

In one embodiment, after the ionic grafting, the counter ion are Cl⁻. Advantageously, the counter-ion of said quaternary ammonium is exchanged with OH⁻. In one embodiment, such exchange is realized with use of an OH ion exchange resin and an alkaline solution of an OH containing salt (typically KOH or NaOH), for example under boiling conditions.

Ionic conductivity is generally greater than 5 mS/cm, preferably greater than 8 mS/cm, and further preferably greater than 10 mS/cm. Ionic conductivity is for example measured by impedance spectroscopy in a water-saturated atmosphere (RH>98%) after deposition of a gold layer with a thickness of 20 nm by cathode sputtering on each face of the membrane.

The composite material can be used in fuel cells, electrochemical devices, chlor-alkali production, metal-ion recovery, water electrolysis, plating, surface treatment of metals, batteries, sensors, Donnan dialysis cells, drug release, gas drying or humidification, and superacid catalysis for the production of fine chemicals.

The invention also relates to a fuel cell comprising a composite material as defined according to the present invention or obtainable according to a method as defined according to the present invention.

The invention also relates to an ink comprising a composite material as defined according to the present invention or obtainable according to a method as defined according to the present invention.

The invention also relates to the use of a composite material as defined according to the present invention, or obtainable according to a method as defined according to the present invention, as a membrane in a fuel cell or in a captor.

Advantageously, a composite material according to the present invention enable to replace platinum by nickel in a fuel cell.

Advantageously, the present invention provides an anionic conductor starting from a cationic conductor.

Advantageously, the present invention maintain the structure of the porous solid matrix such as Nafion®.

Advantageously, the present invention uses a few quantity of polymerizable molecule.

According to an aspect, the present invention relates to an anionic membrane consisting of or comprising a composite material according to the present invention. The cationic composite material of the invention may be used in an alkaline medium, which allows it to be used as an anionic membrane of hydroxide ions.

According to an aspect, the present invention relates to a device comprising an anionic membrane consisting of or comprising a composite material as defined according to the present invention.

The membrane of the invention may be integrated into a bipolar or unipolar architecture. The cell according to the invention is notably adapted to the power supply of portable electronic devices.

According to an aspect, the present invention relates to a fuel cell comprising a membrane comprising or consisting of a composite material according to the present invention as defined according to the invention.

Methods for preparing fuel cells are described in the prior art and may be applied by analogy.

Present microcells consist of a stack of membranes and electrodes which are compressed in order to guarantee the seal.

The microcells according to the invention may be manufactured in series according to automated means of the semi-conductor industry. The size and the geometrical arrangement of the cells may be easily adapted.

A fuel cell according to the present invention may advantageously have:
  a cathode portion comprising a cathode;
  an anode portion comprising an anode;
  one or several devices for putting a water source and/or an oxygen source in contact with the cathode portion;
  a hydrogenated porous silicon in contact with the anode portion;
  said cathode portion and anode portion being physically separated by an anionic membrane according to the present invention.

The hydroxide ions $OH^-$ can be transferred from the cathode to the anode through the anionic membrane according to the present invention.

The invention therefore relates to a method for producing dihydrogen, for example from water and oxygen.

According to the invention, the temperature of functioning of said fuel cell is generally comprised between about 10° C. and about 70° C., and preferably room temperature (20-25° C.). The reaction preferably takes place at atmospheric pressure or at slightly higher pressures, generally less than or equal to about 2 bars, comprised between about 1 bar and 1.5 bars.

The diffusing medium of a fuel cell is generally an electron conductor and for example consists of woven carbon fibers in which porous graphite particles are included. The gas molecules pass in this case through the grid of woven fibers and the electrons are conveyed by the carbon fibers. According to another embodiment, it also consists of a cross-linked polymer pervious to gases such as PDMS (polydimethysiloxane) loaded with porous graphite particles.

The catalyst is often formed with a finely divided metal incorporated into the porous graphite particles. Platinum may be used, but as indicated earlier, it is desired to avoid this metal. Therefore, it possible to use for example nickel as a replacement.

Several methods may be used for stacking the active layers of a fuel cell. A first method consists of superposing the layers on each other, generally from the anode to the cathode in order to form a complete stack of a microcell. A second method consists of making the anode and the cathode separately, in order to then assemble them, for example under a press. Although different in their final assembling mode, both of these methods use similar techniques for depositing layers. For example it is possible to start with a gas diffusion layer (GDL) which for example corresponds to the hydrogenated silicon able to generate dihydrogen, and then deposit an anode collector (for example by cathode sputtering, evaporation or electrodeposition) and then deposit an anode catalyst for forming the anode portion. The anode catalyst may be deposited by sputtering (spray), ink jet or electrodeposition. Next, it is possible to deposit the composite material according to the present invention (forming an anode membrane), for example by spraying (spray) or ink jet. It is then possible to deposit, for example also by spraying (spray) or ink jet the cathode catalyst, and then the cathode collector in order to form the cathode portion.

The way of rinsing the device at final and/or intermediate steps are known by a skilled person.

In order to ensure quality control of the product during its manufacturing, it is possible to conduct analyses by infrared spectroscopy (FTIR) between certain manufacturing steps. More particularly, it is possible to carry out such a control before and/or after contacting the solid porous membrane with the polymerizable molecule and/or before and/or after polymerization (oligomerization) of the polymerizable molecule.

Advantageously, the prepared composite material are stored in water in the presence of a hydroxide ion exchanger resin.

Typically, the device of the invention, and more particularly the fuel cell, may be transportable or fixed.

Advantageously, the device may be biocompatible and comprise a membrane comprising or consisting of a composite material as defined according to the invention.

According to the invention, any embodiment, preferred feature or characteristic, or example may be combined with one or more other embodiments, preferred features or characteristic, or examples unless technically impossible.

In the invention, the use of the term of «one» means «at least one».

Other objects, features and advantages of the invention will become clearly apparent to one skilled in the art following the reading of the explanatory description which refers to examples which are only given as an illustration and which by no means can limit the scope of the invention. Thus, each example has a general scope.

On the other hand, in the examples, all the percentages are given by mass, unless indicated otherwise, and the temperature is expressed in degree Celsius and is room temperature (20-25° C.), unless indicated otherwise, and the pressure is atmospheric pressure (101325 Pa), unless indicated otherwise.

EXAMPLES

Example 1—Preparation of a Composite Material According to the Invention by CPV

This process is used to convert a cationic catalyst ink to an anionic one after spraying or commercial cationic electrodes made with Vulcan Xc-72 with platinum and Nafion before assembling.

The sample, a 9 mm diameter disk of vulcan XC-72 with 20% platinum is placed in a sealed glass vial above a drop of 30 µl of TMSPA (in solution in methanol 50%). Adsorption is allowed at 10° C. during one day. Then, the sample is placed at 60° C. in a new vial with a drop of water during one day to allow the hydrolysis and the polymerization of the adsorbed molecules of silane.

Example 2—Preparation of a Composite Material According to the Invention by Dip Impregnation A 5×7 cm plate of Nafion® NRE 212 is immerged and agitated in a closed glass box containing 25 ml of TMSPA (in solution in methanol 50%) avoiding contact with the walls. Adsorption is allowed at 10° C. during one day. The pH of the solution decreases to 3, indicating the expulsion of the hydronium ions from the nafion when they are replaced by quaternary ammonium silane ions. Then, the plate is placed in another clean closed glass box with 25 ml of TMSPA during another day at 10° C. After that, the plate is placed in a new closed glass box with a drop of water at 60° C. during one day to hydrolyze and polymerize the silane.

Example 3—Technical Results on the Composite Material

Figure 1:
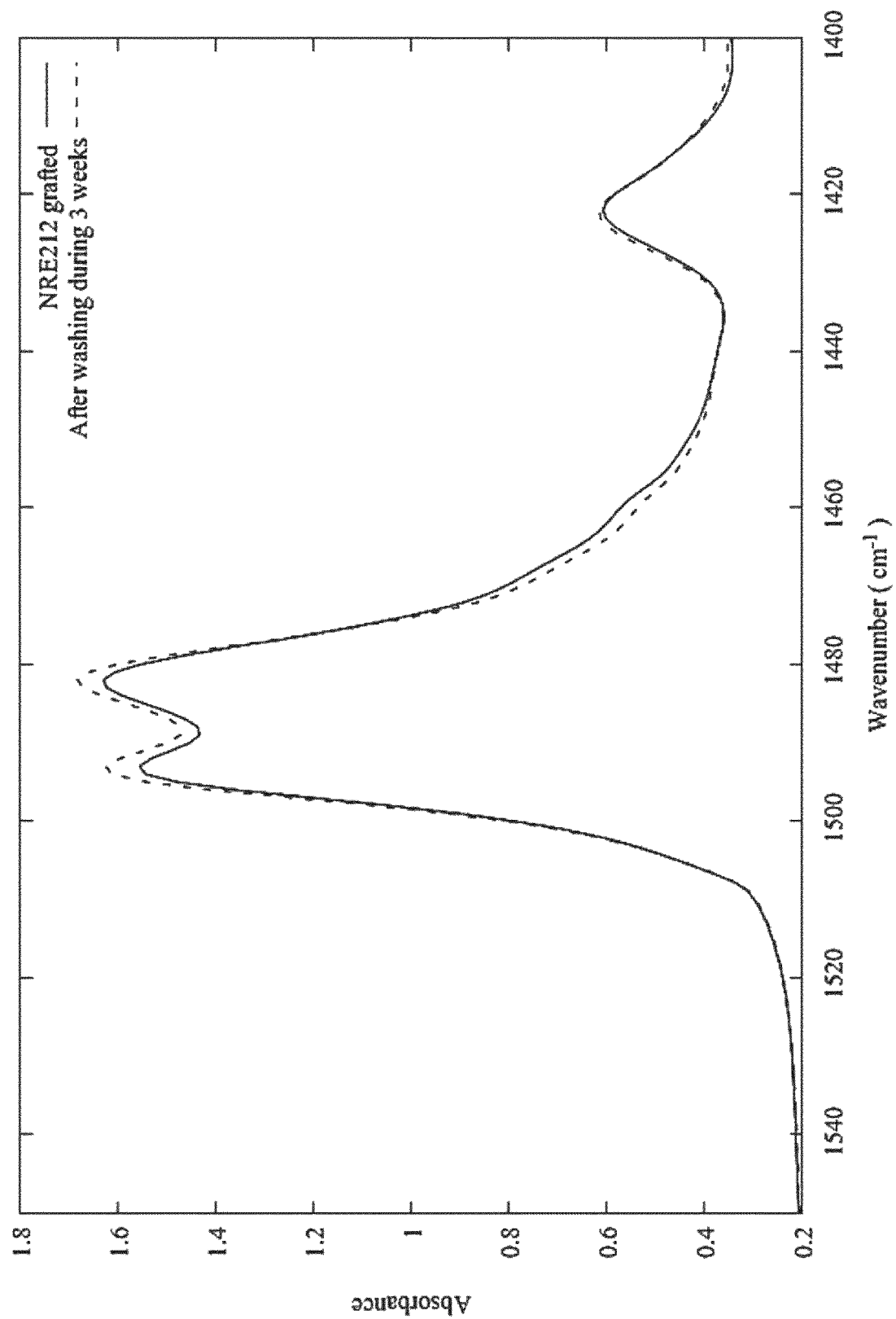
FIG. 1 illustrates the stability of the ionic grafting, highlighted by long time water washing of NRE212-TMSPA grafted.
Figure 2:
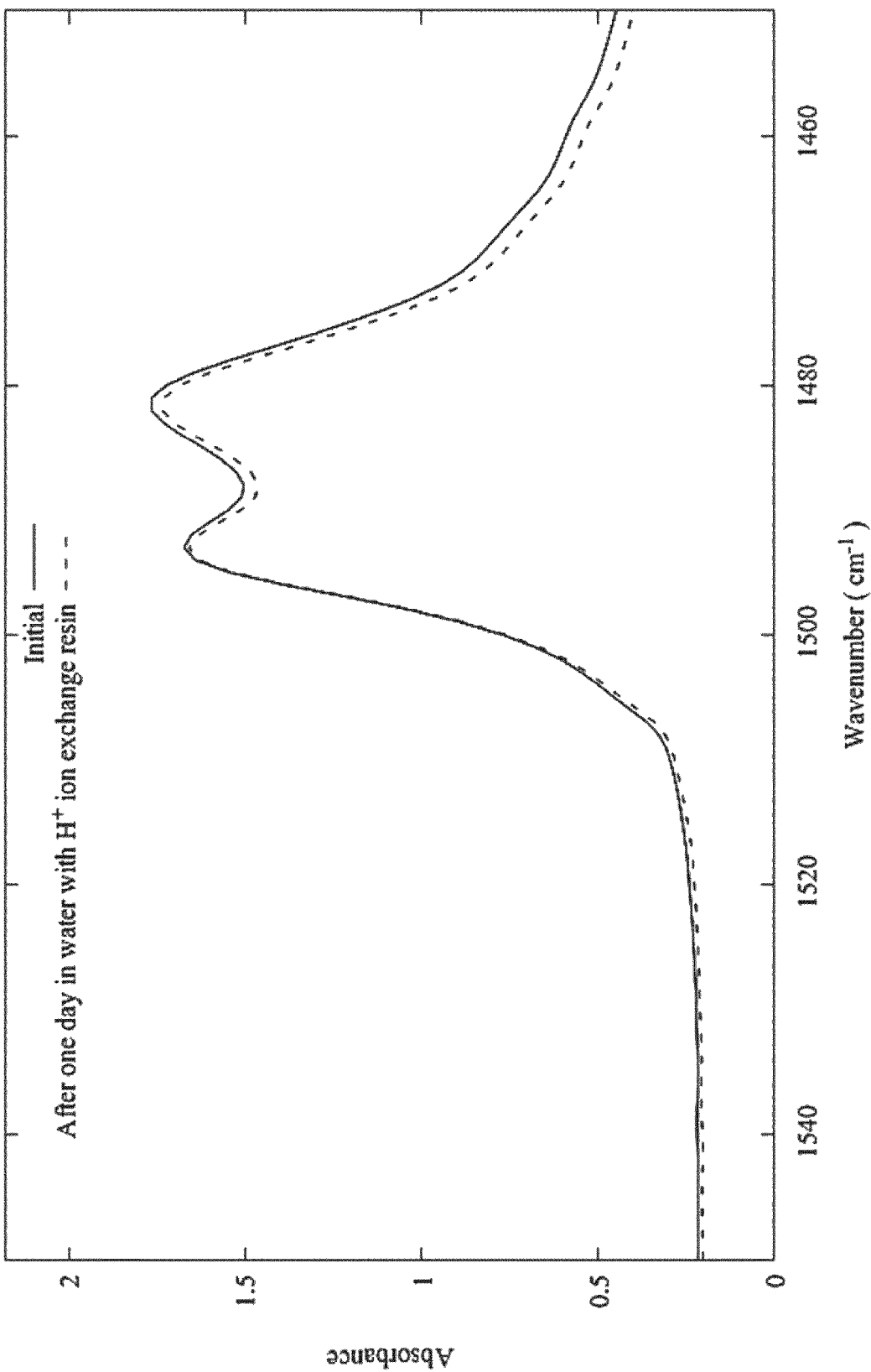
FIG. 2 illustrates the full polymerization, highlighted by exchange with ionic H$^+$ resin of NRE212-TMSPA grafted.

The characterization by Infrared spectroscopy of a composite material according to example 2 is then realized. The stability of the result was insured by washing with water during 3 weeks (FIG. 1). The total polymerization was proved (no residual monomers) by washing with water in the presence of ion exchange resin H$^+$ (FIG. 2).

Figure 3:
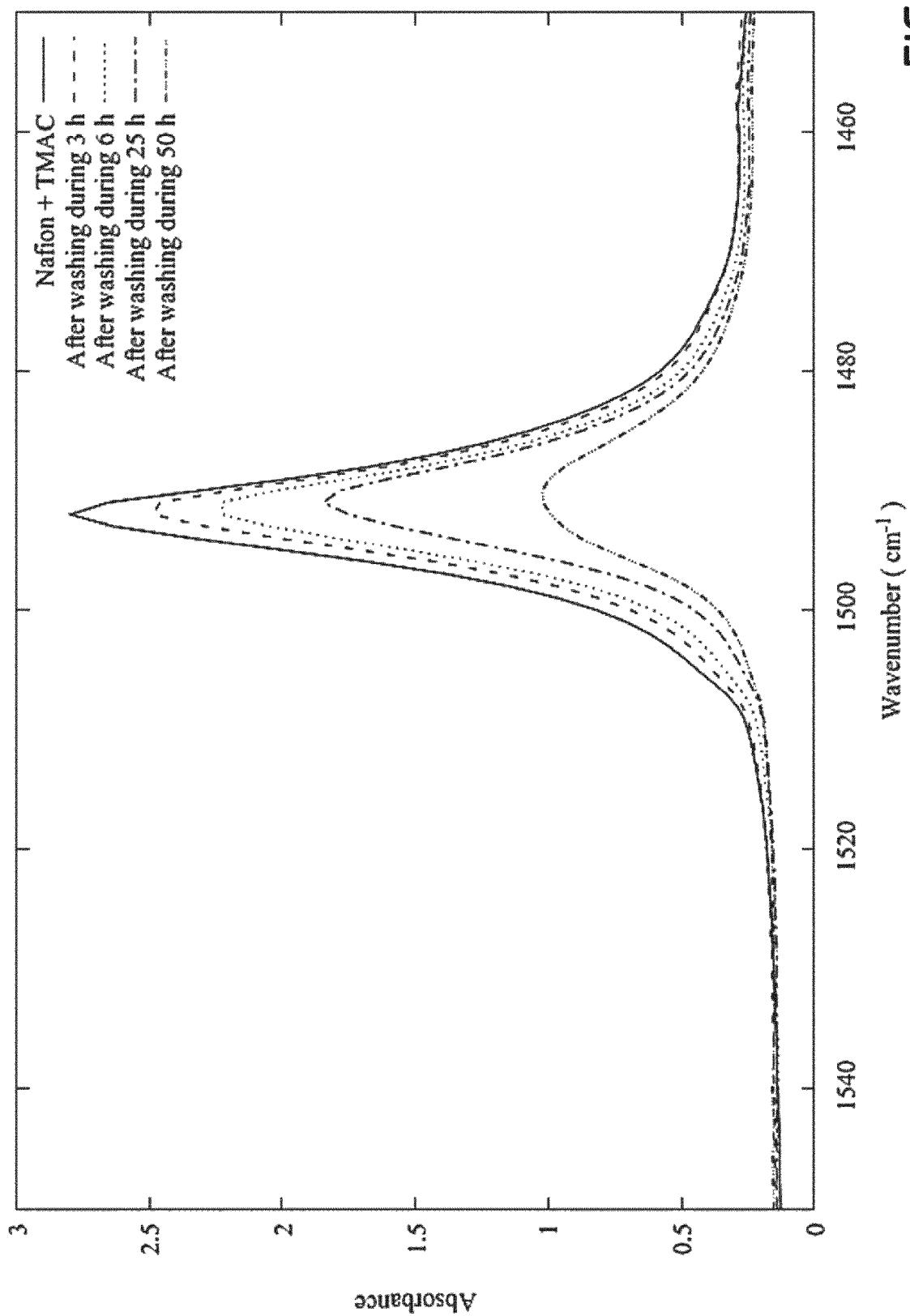
FIG. 3 illustrates the ionic nature of the interaction between sulfonate and quaternary ammonium, highlighted by water washing of NRE212-TMAC grafted.
Figure 4:
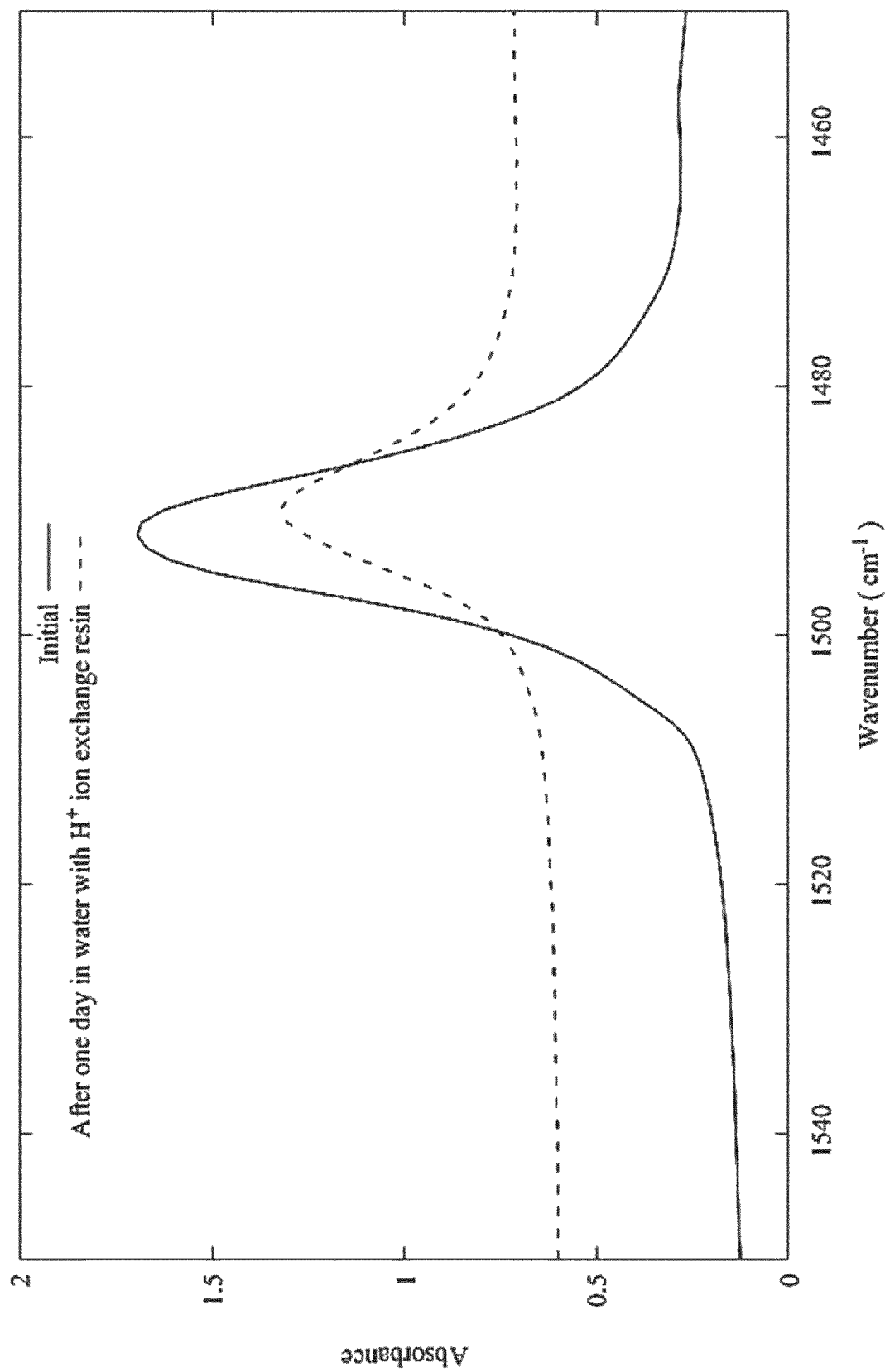
FIG. 4 illustrates the reversibility of the ionic interaction, highlighted by exchange with ionic H$^+$ resin of NRE212-TMAC grafted.

As a comparison, FIGS. 3 and 4 represent the characterization by Infrared spectroscopy of a composite material wherein the grafting is realized in the same conditions but with Tetramethylammonium chloride (TMAC: CAS 75.57.0), a non polymerizable molecule. The exchange with H$^+$ resin proves the ionic nature of the sulfonate-quaternary ammonium bond.

Example 4—Preparation of a Fuel Cell According to the Invention

The anionic membrane, a 11 mm diametrer disk of Nafion-C, is realized according to example 2 of the invention with Nafion® NRE212 and a TMSPA solution at 50% in methanol. Two 9 mm diameter commercial electrodes made of Vulcan Xc-72 with 20% platinum are modified in gazeous phase according to example 1 of the invention and then pressed at 60° C. at the center on each side of the Nafion-Cl membrane. The assembly is mounted in a homemade cell of active area equal to 0.07 cm$^2$ and connected with hydrogen source produced by electrolysis. Oxygen is from humidified ambiant air.

Example 5—Technical Results on the Fuel Cell

Figure 5:
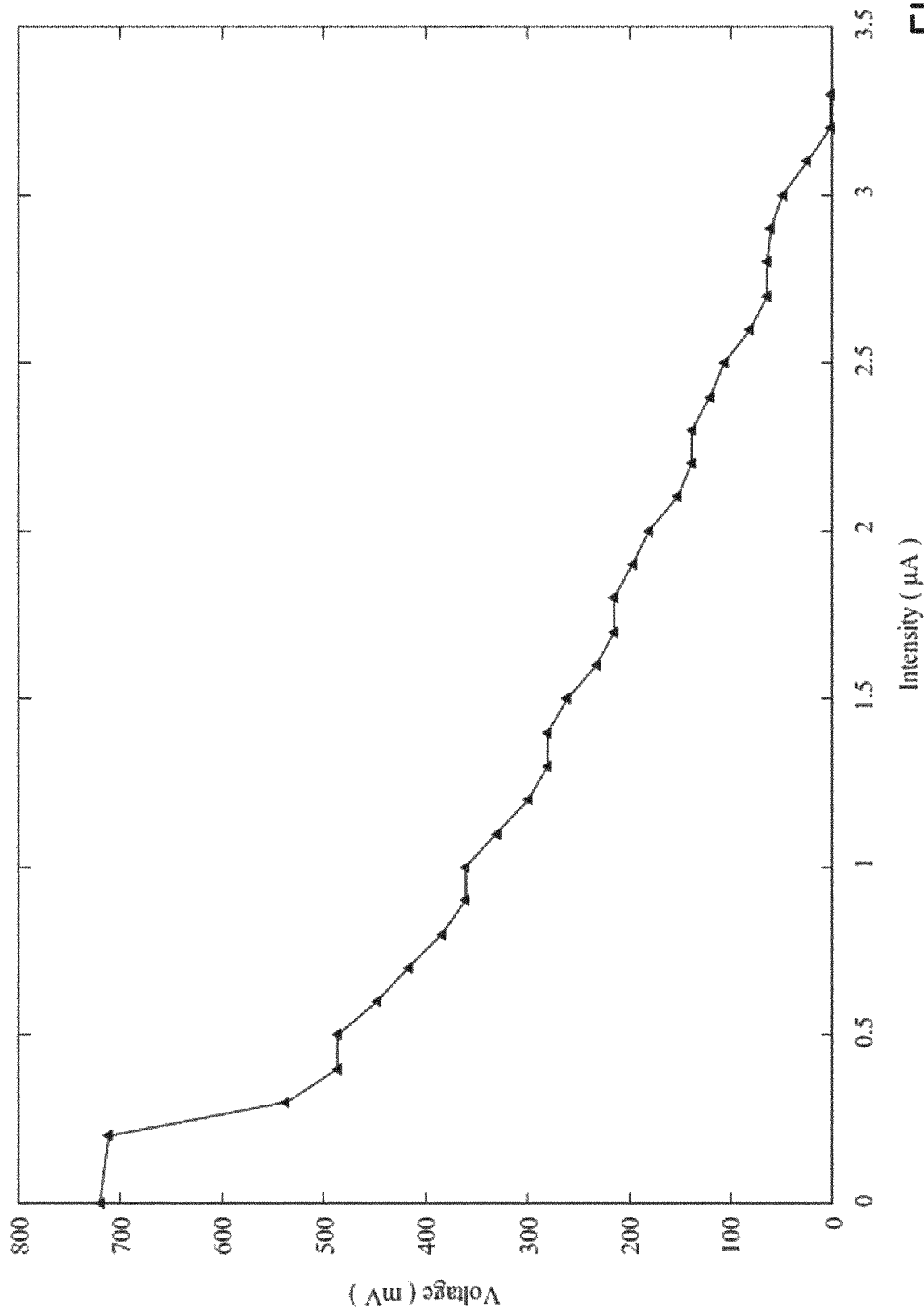
FIG. 5 illustrates the characterization of an anionic fuel cell realized according to the invention.

The characteristic curve of Voltage (mV) as a function of Intensity (µA) for a device according to example 5 is shown on FIG. 5. The OCV and the short circuit current are equal respectively to 700 mV and 3 µA.

As the electrode membrane assembly is not optimized, because the contact area between the membrane and the catalyst is very small (observed after disassembly of the fuel cell after the test), the inventor considers these first results as very promising for an industrial device.

The invention claimed is:

1. An anionic polyelectrolyte comprising a porous solid matrix having interconnected channels, said matrix comprising sulfonate groups on at least a part of the surface of said channels, wherein a sulfonate group is in ionic interaction with a quaternary ammonium of a polymerizable molecule, said polymerizable molecule being polymerized with at least one other polymerizable molecule, wherein said polymerizable molecule is N-dialkoxysilylalkyl-N,N,N-trialkylammonium or N-trialkoxysilylalkyl-N,N,N-tri-alkylammonium.

2. The anionic polyelectrolyte according to claim 1, wherein said porous solid matrix is a sulfonated tetrafluoroethylene membrane.

3. The anionic polyelectrolyte according to claim 1, wherein said polymerizable molecule is polymerized thereby forming an oligomer.

4. The anionic polyelectrolyte according to claim 1, wherein said porous solid matrix is ion conductive.

5. A method for preparing an anionic polyelectrolyte as defined according to claim 1, wherein said method comprises: providing a porous solid matrix having interconnected channels, said matrix comprising sulfonate groups on at least a part of the surface of said interconnected channels; contacting said porous solid matrix with a polymerizable molecule comprising a quaternary ammonium thereby forming ionic interactions between a sulfonate group and quaternary ammonium; and polymerizing, said polymerizable molecule after having contacting said porous solid matrix with said polymerizable molecule, wherein said polymerizable molecule is N-dialkoxysilylalkyl-N,N,N-tri-alkylammonium or N-trialkoxysilylalkyl-N,N,N-tri-alkylammonium.

6. The method according to claim 5, wherein said method comprises:

exchanging a counter-ion of said quaternary ammonium.

7. The method according to claim 5, wherein said polymerizable molecule is deposited by chemical vapor deposition on at least a part of the surface of said interconnected channels of said porous solid matrix.

8. The method according to claim 5, wherein said polymerizable molecule is deposited by dipping said porous solid matrix into a solution comprising said polymerizable molecule.

9. The method according to claim 5, wherein said polymerizable molecule is deposited by chemical vapor deposition on at least a part of the surface of said interconnected channels of said porous solid matrix and then by dipping said porous solid matrix into a solution comprising said polymerizable molecule.

10. The method according to claim 5, wherein the contact of said porous solid matrix with said polymerizable molecule comprising a quaternary ammonium is performed at a temperature of more than 30° C.

11. A fuel cell comprising an anionic polyelectrolyte as defined according to claim 1.

12. The anionic polyelectrolyte according to claim 1 which is a membrane in a fuel cell or in a captor.

13. The anionic polyelectrolyte composite material according to claim 1, wherein said porous solid matrix is a membrane comprised of polytetrafluoroethylene with perfluorovinyl ether groups terminated with sulfonated groups incorporated into a backbone of the polytetrafluoroethylene.

14. The method according to claim 6, wherein the exchanging of a counter-ion of said quaternary ammonium is performed by providing OH— ion to said quaternary ammonium.

* * * * *